United States Patent
Ikawa et al.

(10) Patent No.: US 10,984,033 B2
(45) Date of Patent: *Apr. 20, 2021

(54) DETERMINATION OF EXPERTNESS LEVEL FOR A TARGET KEYWORD

(71) Applicant: INTERNATIONAL BUSINESS MACHINES CORPORATION, Armonk, NY (US)

(72) Inventors: Yohei Ikawa, Tokyo (JP); Shoko Suzuki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 16/055,543

(22) Filed: Aug. 6, 2018

(65) Prior Publication Data

US 2018/0349486 A1 Dec. 6, 2018

Related U.S. Application Data

(63) Continuation of application No. 14/841,367, filed on Aug. 31, 2015, now Pat. No. 10,102,280.

(51) Int. Cl.
*G06F 16/35* (2019.01)
*G06F 16/31* (2019.01)
(Continued)

(52) U.S. Cl.
CPC ............ *G06F 16/35* (2019.01); *G06F 16/322* (2019.01); *G06F 16/355* (2019.01); *G06F 16/36* (2019.01);
(Continued)

(58) Field of Classification Search
CPC ...... G06F 16/35; G06F 16/355; G06F 16/367; G06F 16/36; G06F 40/216; G06K 9/6219;
(Continued)

(56) References Cited

U.S. PATENT DOCUMENTS 5,778,363 A * 7/1998 Light .................... G06F 16/335
6,374,251 B1 * 4/2002 Fayyad .................. G06F 16/35
(Continued)

OTHER PUBLICATIONS

Nakatani, et al., "Adaptive Ranking of Search Results by Considering User's Comprehension", ICUIMC'10, Jan. 2010, 10 pages.
(Continued)

*Primary Examiner* — Dennis Truong
(74) *Attorney, Agent, or Firm* — Tutunjian & Bitetto, P.C.; Randall Bluestone

(57) ABSTRACT

A method, a computer system, and a computer program product for selecting electronic documents based on an expertness level for a target keyword. The method includes identifying a Lowest Common Ancestor (LCA) for each pair of categories to which documents in a document set belong based on a graph having edges which define relationships between nodes representing respective ones of the categories, the document set being associated with a target keyword, obtaining a degree of dispersion of the categories based on respective distances between the categories of each pair and the corresponding LCA, determining an expertness level for the target keyword based on the degree of dispersion, and in response to receiving a search query including the target keyword, selecting one or more documents from a database based on the expertness level for the target keyword.

20 Claims, 5 Drawing Sheets

(51) Int. Cl.
*G06F 16/36* (2019.01)
*G06K 9/62* (2006.01)
*G06N 5/02* (2006.01)
*G06N 20/20* (2019.01)

(52) U.S. Cl.
CPC ......... *G06F 16/367* (2019.01); *G06K 9/6219* (2013.01); *G06K 9/6282* (2013.01); *G06N 5/025* (2013.01); *G06N 20/20* (2019.01)

(58) Field of Classification Search
CPC ...... G06K 9/6282; G06N 5/02; G06N 99/005; G06N 20/00; G06N 5/025
USPC ......... 707/739, E17.058, E17.089, 737, 738, 707/740, 794; 704/9; 706/12
See application file for complete search history.

(56) References Cited

U.S. PATENT DOCUMENTS

| | | | | |
|---|---|---|---|---|
| 7,546,278 | B2* | 6/2009 | Yang | G06K 9/6282 706/20 |
| 8,041,729 | B2* | 10/2011 | Vandelle | G06Q 30/02 707/767 |
| 8,150,831 | B2 | 4/2012 | Zhang et al. | |
| 8,341,159 | B2* | 12/2012 | Gates | G06F 16/355 707/738 |
| 8,930,304 | B2 | 1/2015 | Guo et al. | |
| 8,965,814 | B1* | 2/2015 | Rangan | G06N 20/00 706/12 |
| 2002/0016787 | A1* | 2/2002 | Kanno | G06F 16/30 |
| 2002/0091661 | A1* | 7/2002 | Anick | G06F 16/951 |
| 2002/0156763 | A1* | 10/2002 | Marchisio | G06F 16/30 |
| 2006/0053136 | A1* | 3/2006 | Ashiri | G06F 16/2465 |
| 2007/0112714 | A1* | 5/2007 | Fairweather | G06F 9/4493 706/46 |
| 2008/0010272 | A1* | 1/2008 | Schickel-Zuber | G06F 16/367 |
| 2008/0077570 | A1* | 3/2008 | Tang | G06F 16/3346 |
| 2009/0070101 | A1* | 3/2009 | Masuyama | G06F 16/334 704/9 |
| 2010/0287160 | A1* | 11/2010 | Pendar | G06F 16/90 707/737 |
| 2011/0161285 | A1* | 6/2011 | Boldyrev | G06F 16/27 707/609 |
| 2013/0227104 | A1* | 8/2013 | Lee | G06F 16/355 709/223 |
| 2014/0136468 | A1* | 5/2014 | Faratin | G06F 16/322 706/55 |
| 2015/0169580 | A1* | 6/2015 | Epstein | G06F 16/951 707/749 |
| 2015/0199427 | A1* | 7/2015 | Miyabe | G06F 16/3344 707/739 |
| 2016/0179945 | A1* | 6/2016 | Lastra Diaz | G06F 16/3334 707/739 |
| 2016/0224893 | A1* | 8/2016 | Parker, Jr. | G06N 5/02 |
| 2017/0329845 | A1* | 11/2017 | Epstein | G06F 16/334 |

OTHER PUBLICATIONS

Yan et al., "Concept-based Document Readability in Domain Specific Information Retrieval", CIKM'06, Nov. 2006, pp. 540-549.

Wikipedia, "Creative Commons Attribution-ShareAlike License", Last modified in Jun. 2015. pp. 1-6. Available at: https://en.wikipedia.org/wiki/Portal:Contents/Categories.

Sedgewick, R., et al. "ALGORITHM, 4th Edition—4.2 Directed Graphs". Last modified Aug. 26, 2015. pp. 1-5 Available at: http://algs4.cs.princeton.edu/42directed/.

List of IBM Patents or Patent Applications Treated as Related dated Aug. 6, 2018, 2 pages.

* cited by examiner

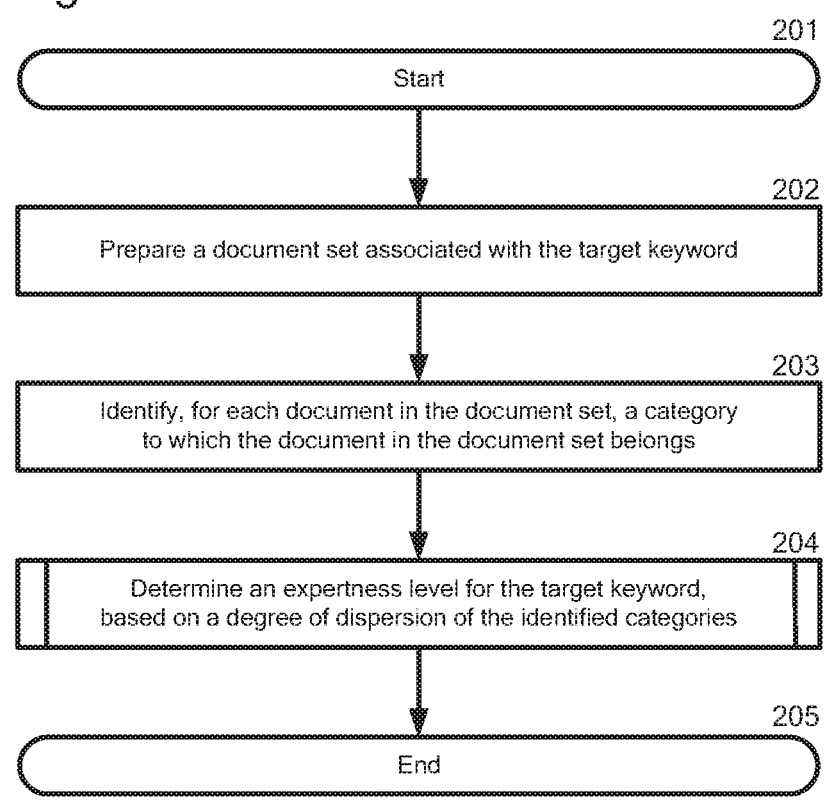

| Target entry | Experiment 1<br>According to one embodiment of the present invention | Experiment 2<br>According to Non-Patent Literature 1 |
|---|---|---|
| Levitation | 10.67816 | 30 |
| Pastel Color | 10.11954 | 34 |
| Point reflection | 9.97619 | 36 |
| Gradation | 9.888992 | 47 |
| DIC Colorguide | 9.86202 | 39 |
| National colors | 9.634424 | 40 |
| Structural coloration | 9.63102 | 50 |
| Foucault pendulum | 9.495968 | 32 |
| Factorization | 9.273273 | 38 |
| Optical compositing | 9.206131 | 47 |

302

| Target entry | Experiment 1<br>According to one embodiment of the present invention | Experiment 2<br>According to Non-Patent Literature 1 |
|---|---|---|
| Neutron capture | 4.732655 | 47 |
| Quantum number | 4.666667 | 44 |
| Current density | 4.655303 | 33 |
| Electronic band structure | 4.643478 | 46 |
| Fermi energy | 4.614973 | 34 |
| Lagrangian mechanics | 4.605911 | 32 |
| Gamma decay | 4.368293 | 41 |
| Green's function | 4.151282 | 41 |
| Positron emission | 3.684034 | 35 |
| Observable | 3.019355 | 32 |

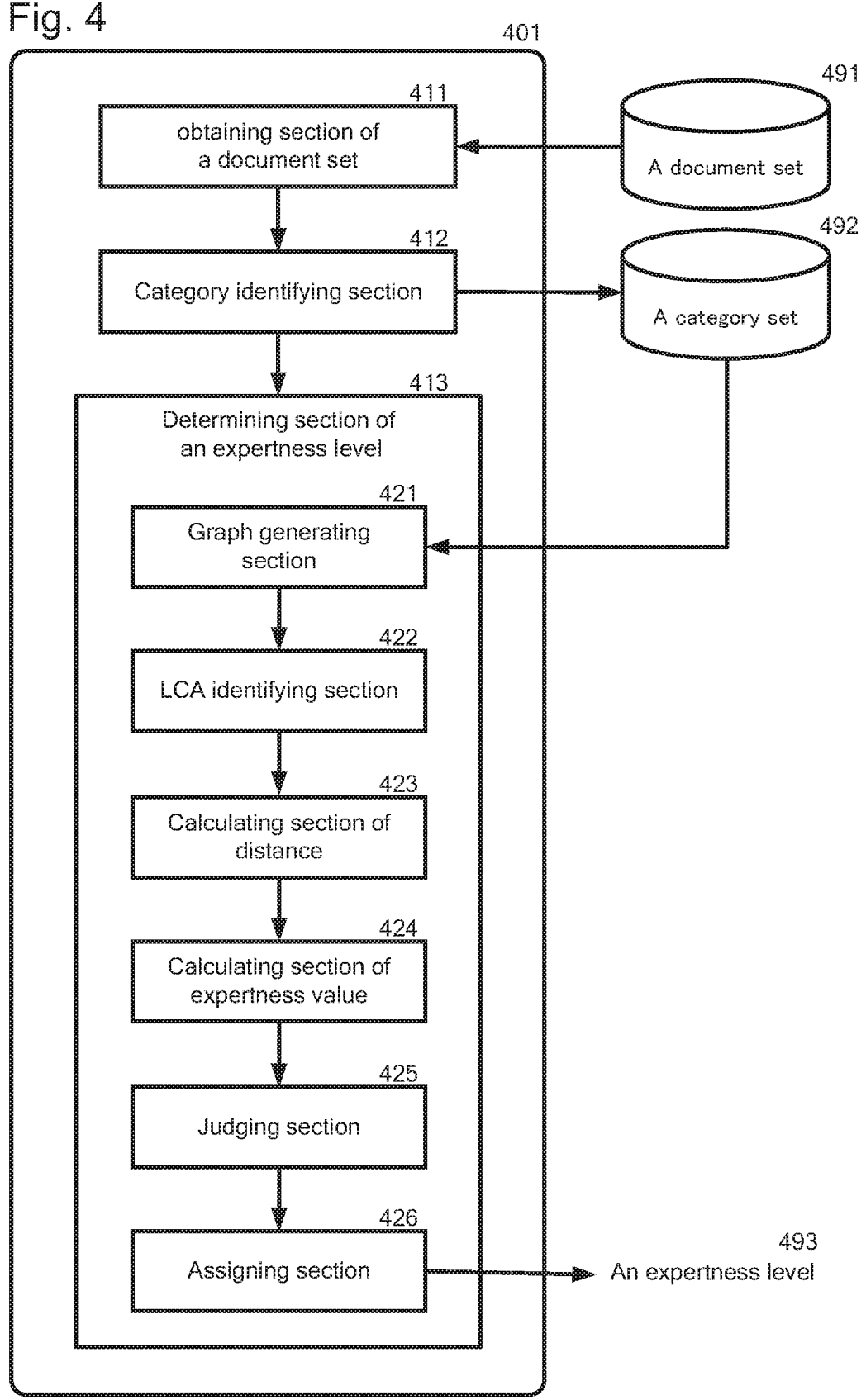

DETERMINATION OF EXPERTNESS LEVEL FOR A TARGET KEYWORD

BACKGROUND

Technical Field

This invention relates to a determination of an expertness level for a target keyword.

Background Art

Techniques for re-ranking search results by considering the user's comprehension level about documents, such as web pages, is known.

For example, a technique is provided in Makoto Nakatani et. al., "Adaptive Ranking of Search Results by Considering User's Comprehension", Proceeding ICUIMC '10 Proceedings of the 4th International Conference Article 27, ACM New York, 2010, which can be downloadable from <URL: http://www.dl.kuis.kyoto-u.ac.jp/~adam/icuimc10.pdf>. (Non-Patent Literature 1).

Another technique is provided in Xin Yan et. al., "Concept-based document readability in domain specific information retrieval", Proceeding CIKM '06 Proceedings of the 15th ACM international conference on Information and knowledge management, ACM New York, pp. 540-549, 2006, which can be downloadable from <URL: http://dl.acm.org/citation.cfm?id=1183692>. (Non-Patent Literature 2).

SUMMARY

According to an aspect of the present invention, an embodiment of the present invention provides a computer-implemented method for determining an expertness level for a target keyword. The method includes preparing a document set associated with the target keyword, identifying, for each document in the document set, a category to which the document in the document set belongs, and determining an expertness level for the target keyword, based on a degree of dispersion of the identified categories.

According to an aspect of the present invention, an embodiment of the present invention provides a computer-implemented method for selecting electronic documents based on an expertness level for a target keyword. The method includes identifying a Lowest Common Ancestor (LCA) for each pair of categories to which documents in a document set belong based on a graph having edges which define relationships between nodes representing respective ones of the categories, the document set being associated with a target keyword, obtaining a degree of dispersion of the categories based on respective distances between the categories of each pair and the corresponding LCA, determining an expertness level for the target keyword based on the degree of dispersion, and in response to receiving a search query including the target keyword, selecting one or more documents from a database based on the expertness level for the target keyword.

According to another aspect of the present invention, a computer system including a computer readable storage medium storing a program of instructions executable by the computer system to perform one or more methods described herein may be provided.

According to yet another aspect of the present invention, a computer program product comprising a non-transitory computer readable storage medium storing a program of instructions executable by the computer system to perform one or more methods described herein also may be provided.

These and other features and advantages will become apparent from the following detailed description of illustrative embodiments thereof, which is to be read in connection with the accompanying drawings.

BRIEF DESCRIPTION OF THE DRAWINGS

FIGS. 2A and 2B illustrate one embodiment of a flowchart of a method for determining an expertness level for a target keyword;

FIG. 3 illustrates determined expertness level for the target keywords as a result of performing a flowchart described in FIGS. 2A and 2B; and FIG. 4 illustrates an embodiment of an overall functional block diagram of a computer system hardware used in accordance with the embodiment of the flowcharts described in FIGS. 2A and 2B.

DETAILED DESCRIPTION OF THE EMBODIMENTS

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
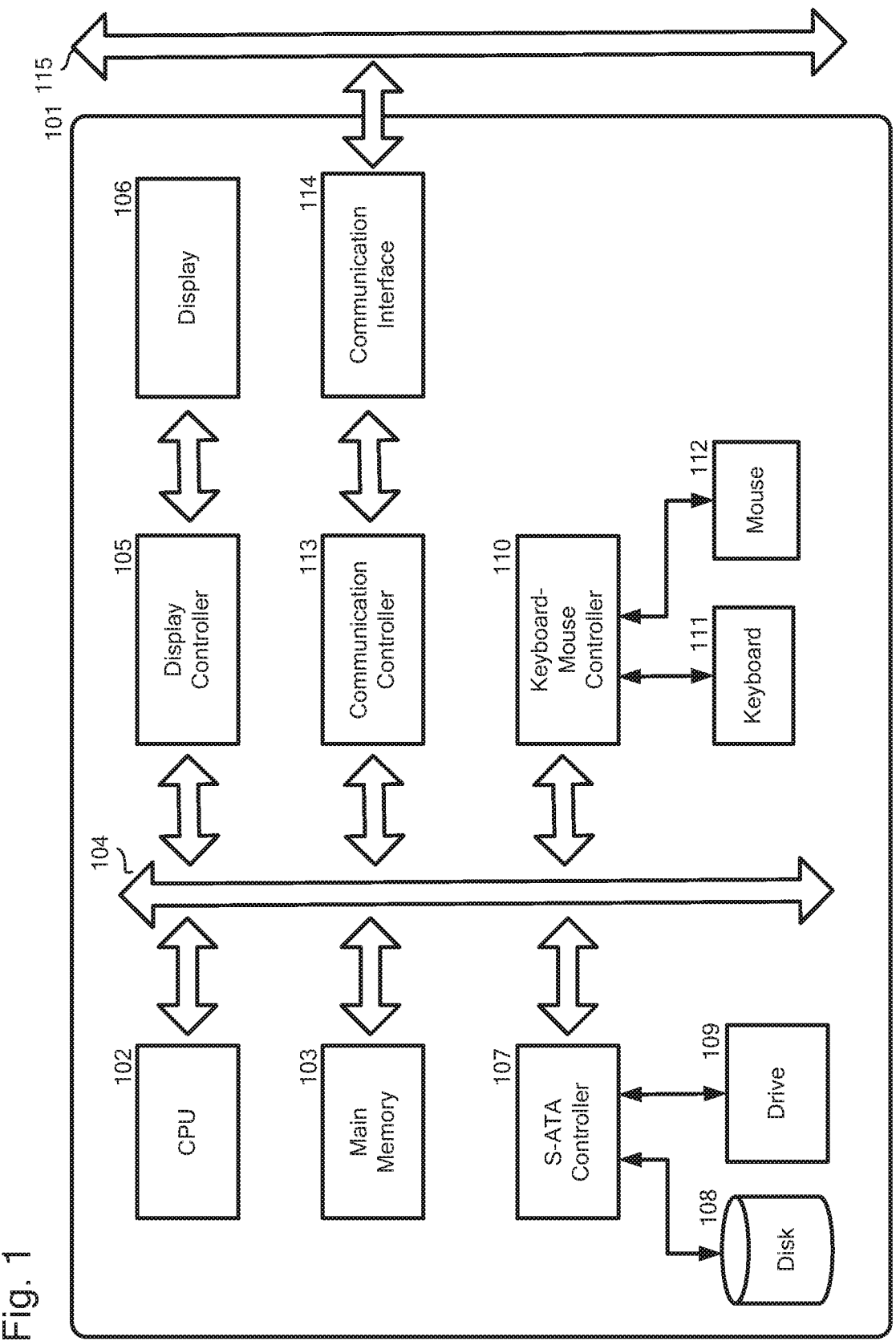
FIG. 1 illustrates an exemplified block diagram of a computer hardware used in an embodiment of the present invention.

With reference now to FIG. 1, FIG. 1 illustrates an exemplified block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more computer processing units (CPUs) (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106), such as a liquid crystal display (LCD), may be connected to the bus (104) via a display controller (105). The display (106) may be used to display, for management of the computer(s), information on a computer connected to a network via a communication line and information on software running on the computer using an appropriate graphics interface. A disk (108), such as a hard disk or a solid state drive (SSD), and a drive (109), such as a CD, a DVD, or a BD (Blu-ray disk) drive, may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 2B:
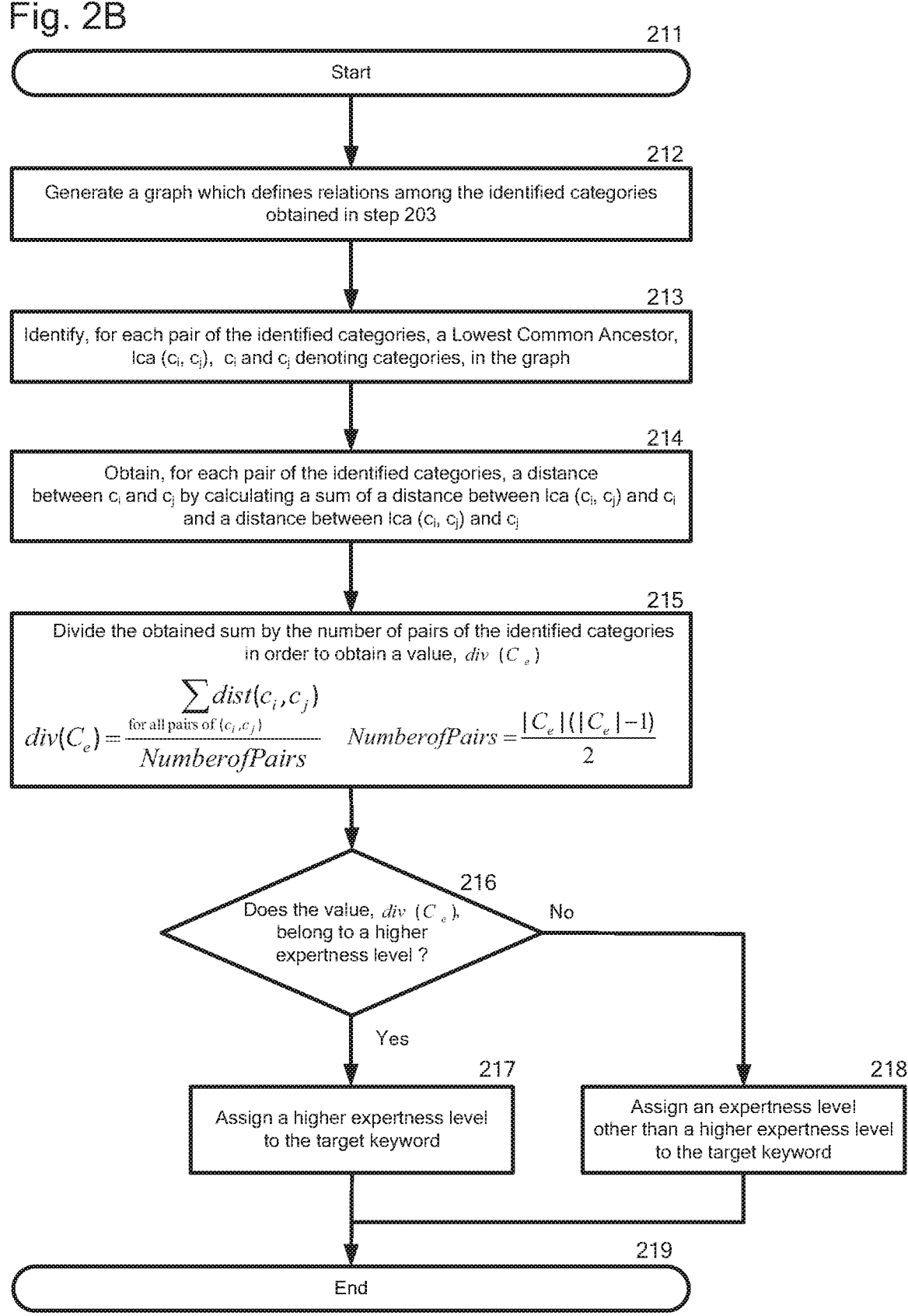

With reference now to FIGS. 2A and 2B, FIGS. 2A and 2B illustrate one embodiment of a flowchart of a method for determining an expertness level for a target keyword, according to one embodiment of the present invention.

A system such as the computer (101) may perform the methods described in FIGS. 2A and 2B. The system may be implemented as a single computer or a plurality of computers.

FIG. 2A illustrates an embodiment of an overall flowchart performed according to one embodiment of the present invention.

In step 201, the system starts the method for determining an expertness level for a target keyword.

In one embodiment, the target keyword may be selected by the system or other systems, on the basis of a keyword list which includes keywords, each of which keywords may be a candidate to be determined an expertness level. In another embodiment, the target keyword may be selected by the system or other systems from, for example, a document set described in step 202 or a glossary in a specific field, according to an instruction from a user or administrator who requires an expertness level for a target keyword.

In step 202, the system prepares a document set associated with the target keyword. The system may obtain the document set from a storage where the document set is stored or download the document set from an internet or intranet.

The document set comprises a plurality of documents. Each document in the document set may be associated with a category, but there is no harm when the document set includes a document which is not associated with a category. The category is intended to group together documents on similar subjects. In one embodiment, each document in the document sets may have category information, such as [[Category:XYZ]], in the document. The category information may be displayed, for example, at the bottom of a page on the display (106) or may be inserted into in the Markup language file of the document as a hidden character. In another embodiment, each document in the document set may be linked to category information which is stored, for example, as a table in storage (108).

Category information may be used to link documents under a common topic. The category may be for example, but not limited to, those used in Wikipedia, as described in the following URL:<https://en.wikipedia.org/wiki/Portal:Contents/Categories>. Any other categories can be used for performing an embodiment of the present invention.

Each document in the document set may link to the target keyword or have the target keyword in the document. However, the link or the target keyword are not absolutely necessarily to perform an embodiment of the present invention.

The document set may be obtained from, for example, but not limited to, Wikipedia articles. In one embodiment, if the document set is obtained from Wikipedia articles, the document set comprises documents which link to a document having a Wikipedia article(s) corresponding to a target keyword. Each Wikipedia article is also called an entry. In another embodiment, the whole Wikipedia is used as a document set. An embodiment using the Wikipedia articles are described in FIG. 4 below.

In one embodiment of the present invention, the system prepares a document set $D_e$ from Wikipedia articles which refer the target entry e. In one embodiment, the preparation of the document set $D_e$ may be directly performed by the system. In another embodiment, the preparation of the document set $D_e$ may be performed by reading the document set $D_e$ from storage.

In one embodiment, the document set may be a whole or a part of the Wikipedia articles. When part of the Wikipedia articles are used, any documents which link to a document comprising a target keyword may be selected.

In step 203, the system identifies, for each document in the document set, a category to which the document in the document set belongs. Accordingly, the system may obtain a category set. In a case of Wikipedia articles, each article is associated with a category. If each document in the document set is not associated with a category, the system may add a category by using an approach of a document classification, according to the present principles. For example, the system may construct a classifier from a document set which has been already classified into categories and, then, associate category information with each document in a document set, using the constructed classifier, where each document in the document set is not yet classified into a category.

In one embodiment of the present invention, the system prepares a category set $C_e$ identified from the document set $D_e$.

In step 204, the system determines an expertness level for the target keyword, based on a degree of dispersion of the identified categories.

The details of the step 204 are explained, according to a method described in FIG. 2B.

FIG. 2B describes a detailed method of step 203 described in FIG. 2A.

In step 211, the system starts the method described in step 203.

In step 212, the system generates a graph which defines relations among the identified categories, e.g., a category set. Any graph which may allow a calculation of a degree of dispersion may be used for an embodiment of the present invention. One example of such graph is a Directed Acyclic Graph (DAG). The DAG is known to a person skilled in the art. The DAG consists of the following elements:

Nodes: Each node represents a category in an embodiment of the present invention;

Directed edges: A directed edge (or "arrow") from one node to another represents some kind of relationship between those two nodes. In an embodiment of the present invention, the arrow means "is based on". Arrows in a DAG may not form a cycle;

A root node: At least one of the nodes will have no parents. This is the root of the DAG. The root node is used for representing a top-level category in an embodiment of the present invention. For example, the root node corresponds to a main topic classification category in the Wikipedia;

Leaf nodes: One or more of the nodes will have no children. These are called leaves or leaf nodes. Each leaf node is used for representing each category of documents in the document set; and A category residing in an arrow direction for an edge represents an upper level of the categories.

For more details of a DAG is described, for example, in "ALGORITHM, 4$^{TH}$ EDITION", 4.2 "DIRECTED GRAPHS", which can be downloadable from the following URL: <URL: http://algs4.cs.princeton.edu/42directed/>.

In one embodiment of the present invention, the system generates a graph G from the category set $C_e$.

In step 213, the system identifies, for each pair of the identified categories, a Lowest Common Ancestor (LCA), lca ($c_i$, $c_j$), $c_i$ and $c_j$ denoting categories, in the graph generated in step 212. The LCA is known to a person skilled in the art. The LCA of two nodes $c_i$ and $c_j$ in the graph, such as the DAG, is the lowest (e.g., deepest) node that has both $c_i$ and $c_j$ as descendants, where each node is defined to be a descendant of itself. Accordingly, if $c_i$ has a direct connection from $c_j$, $c_j$ is the lowest common ancestor. The LCA of $c_i$ and $c_j$ in the graph is the shared ancestor of $c_i$ and $c_j$ which is located farthest from the root. Computation of lca ($c_i$, $c_j$) is used for determining the distance between pairs of nodes in the graph: the distance from $c_j$ to $c_i$ can be computed as the distance from the root to $c_j$, plus the distance from the root to $c_j$, minus twice the distance from the root to lca ($c_i$, $c_j$).

In one embodiment of the present invention, the system identifies, for each pair of ($c_i$, $c_j$) in the category set $C_e$, the LCA, lca ($c_i$, $c_j$) in the graph G.

In step 214, the system obtains, for each pair of the identified categories, a distance between $c_i$ and $c_j$ by calculating a sum of a distance between lca ($c_i$, $c_j$) and $c_i$ and a distance between lca ($c_i$, $c_j$) and $c_j$.

A distance between $c_i$ and $c_j$ may be described as dist ($c_i$, $c_j$). A distance between lca ($c_i$, $c_j$) and $c_i$ may be described as dist{lca ($c_i$, $c_j$), $c_i$}. A distance between lca ($c_i$, $c_j$) and $c_j$ may be described as dist{lca ($c_i$, $c_j$), $c_j$}. Accordingly, dist ($c_i$, $c_j$) is calculated as follows:

$$\text{dist}(c_i, c_j) = \text{dist}\{\text{lca}(c_i, c_j), c_i\} + \text{dist}\{\text{lca}(c_i, c_j), c_j\}.$$

In step 215, the system divides a sum of the obtained distances by the number of the pairs of the identified categories.

In one embodiment, the system calculates a degree of dispersion as a deviation value of the target keyword, div ($C_e$), as follows:

$$div(C_e) = \frac{\sum_{\text{for all pairs of}(c_i, c_j)} dist(c_i, c_j)}{NumberofPairs}$$

$$NumberofPairs = \frac{|C_e|(|C_e| - 1)}{2}$$

Accordingly, the degree of dispersion is obtained, based on an average of distances of all pairs of the identified categories, using the graph.

In step 216, the system judges whether expertness value belongs to a higher expertness level or not.

In one embodiment, the system uses the degree of dispersion, such as div ($C_e$), as an expertness value and judges whether the value of div ($C_e$) for the target keyword belong to a higher expertness level or not. The system may sort div ($C_e$)s for target keywords in an ascending sequence and, then, select a predetermined number, for example 5 to 10, of div ($C_e$)s from the beginning of div ($C_e$) having a minimum value. The system may judge that a target keyword having relatively lower div ($C_e$) belongs to a higher expertness level, compared to other div ($C_e$)s. This is because a keyword having a higher degree of dispersion is considered to be used in a broader field and this means that an expertness level of such keyword seems to be lower; while, a keyword having a lower degree of dispersion is considered to be used in a narrower field and this means that an expertness level of such keyword seems to be higher. If the judgment is positive, namely for the target keyword(s) having relatively lower div ($C_e$), the system proceeds with step 217. Otherwise, namely, for the remaining target keyword(s), the system proceeds with step 218.

In another embodiment, the system further calculates expertness value as for example, but not limited to, on the basis of the characteristics, that is, a sum of the degree of dispersion and the number of the documents in the document set, by using the following Equation-1:

the expertness value=α×(the degree of dispersion)+ β×(the number of the documents in the document set)   Equation-1:

where the parameters, α and β, are weights. The parameters, α and β, may be independently decided. In one embodiment, the parameters, α and β, are adopted by preparing training data comprising keywords, each of the keyword is manually associated with an expertness level, and, then, selecting the parameters having the most accuracy among a combination of the parameters, α and β. In another embodiment, β may be, for example, expressed as, for example, 1−α. The parameters, α and β, may be decided by a person skilled in the art. The degree of dispersion may be decided as mentioned above. The number of the document set denotes the number of the document which is included in the document set. The number of the documents in the document set may be calculated, according to Non-Patent Literature 1 described above.

Further, the system may use other characteristics for calculating the expertness value in addition to the degree of dispersion and the number of the documents in the document set. The other characteristics may be related information obtained from the graph or related information of documents in the document set. The other characteristics may be, for example, but not limited to, depth in the graph and tf-idf for the target keyword. If the other characteristics are used for calculating the expertness value, the system further calculates expertness value as, for example, but not limited to, on the basis of the characteristics, that is, a sum of the degree of dispersion, the number of the documents in the document set and at least one of the other elements, by using the following Equation-2:

The expertness value=α×(the degree of dispersion)+ β×(the number of the documents in the document set)+γ×(depth in the graph)+δ×(tf-idf for the target keyword)+etc.          Equation-2:

where parameters, α, β, γ and δ, are weights. The parameters, α, β, γ and δ, may be independently decided.

The system may sort the expertness value calculated from the equation above in an ascending sequence and, then, select a predetermined number, for example 5 to 10, of the expertness value from the beginning of the expertness value having a minimum value. The system may judge that a target keyword having relatively lower expertness value belongs to a higher expertness level, compared to other the expertness values. If the judgment is positive, namely for the target keyword(s) having relatively lower expertness value, the system proceeds with step 217. Otherwise, namely, for the remaining target keyword(s), the system proceeds with step 218.

In step 217, the system assigns a higher expertness level to the target keyword(s) having relatively lower expertness value or div ($C_e$). Namely, on condition that the degree of dispersion is lower, the expertness level for the target keyword is determined to be higher or a higher expertness level is assigned to the target keyword.

In step 218, the system assigns an expertness level other than a higher expertness level, for example, but not limited to, a lower expertness level or middle expertness level, to remaining target keyword(s).

The system may assign any kind of ranking to the target keyword as follows:
a higher level, a middle level, a lower level;
ranking numerals such as levels of, for example, 1 to 10;
ranking such as A, B, C; or
ranking such as ○, x, Δ.

In step 219, the system terminates the method described in step 203.

Returning to FIG. 2A, in step 205, the system terminates the method for determining an expertness level for a target keyword.

The determined expertness level may be used for selecting suitable materials, according to an expertness, comprehension level or ages of the user. The materials may be readable materials, for example, but not limited to, web pages, learning contents, news articles, books, magazines and technical documents.

FIG. 3 illustrates determined expertness levels for the target keywords as a result of performing a method described in FIGS. 2A and 2B.

The Japanese Wikipedia was used for this experiment. 160 Japanese target entries (namely, target keywords) in "physics" category of which citation count is from 30 to 50 were used for determining an expertness level for each entry.

Experiment 1 was performed according to a method of one embodiment of the present invention. In experiment 1, the method is according to the flowchart 2A and 2B and the value of div ($C_e$) is used as an expertness value.

Experiment 2 was performed according to a method of Non-Patent Literature 1. In experiment 2, an expertness level is calculated by only using a citation count in each Wikipedia article.

Table 301 shows ten target entries which are determined as a lower expertness level, according to one embodiment of the present invention, or experiment 1, and the values obtained from the experiments 1 and 2, respectively.

Table 302 shows ten target entries which are determined as a higher expertness level, according to one embodiment of the present invention, or experiment 1, and the values obtained from the experiments 1 and 2, respectively.

As seen in the results, according to a method of one embodiment of the present invention, or experiment 1, a category dispersion of Wikipedia articles which cite the target entry was considered, as seen in Tables 301 and 302. Accordingly, calculation of a degree of dispersion of the identified categories allows a system to decide an expertness level of an entry cited by limited categories or of an entry cited by various categories of Wikipedia articles is lower.

As seen in the results, according to a method of Non-Patent Literature 1, or experiment 2, the expertness levels are similar, as seen in Tables 301 and 302. Further, as seen in the results, according to a method of Non-Patent Literature 1, a feature of Wikipedia articles which cite the target entry are not considered, as seen in Tables 301 and 302.

The present invention uses a category dispersion, as described above. Therefore, the present invention does not depend on a language. Accordingly, when the English Wikipedia is used instead of the Japanese Wikipedia, a similar result will be obtained, according to an embodiment of the present invention.

FIG. 4 illustrates an embodiment of an overall functional block diagram of a computer system hardware used in accordance with the embodiment of the flowcharts described in FIGS. 2A and 2B.

The system (401) corresponds to the computer (101) described in FIG. 1.

The system (401) comprises an obtaining section of a document set (411), a category identifying section (412) and a determining section of an expertness level (413).

In an embodiment, the system (401) may include one or more storage devices, such a document set database (491) and a category set database (492). The system (401) may store data in and/or obtain the data stored in the one or more storage devices by a user computer or a server computer.

The obtaining section of a document set (411) prepares a document set (491) associated with the target keyword.

The obtaining section of a document set (411) may perform step 202 described in FIG. 2A.

The category identifying section (412) identifies a category to which the document in the document set belongs to obtain a category set (492).

The category identifying section (412) may perform step 203 described in FIG. 2A.

The determining section of an expertness level (413) determines an expertness level for the target keyword, based on a degree of dispersion of the identified categories.

The determining section of an expertness level (413) comprises a graph generating section (421), an LCA identifying section (422), a calculating section of distance (423), a calculating section of expertness value (424), a judging section (425) and an assigning section (426).

The graph generating section (421) generates a graph which defines relations among the identified categories or the category set in order to obtain the degree of dispersion of the identified categories.

The graph generating section (421) may perform step 212 described in FIG. 2B.

The LCA identifying section (422) identifies an LCA, lca ($c_i$, $c_j$), ci and $c_j$ denoting categories, in the graph generated by the graph generating section (421).

The LCA identifying section (422) may perform step 213 described in FIG. 2B.

The calculating section of distance (423) calculates a sum of a distance between lca ($c_i$, $c_j$) and $c_i$ and a distance between lca ($c_i$, $c_j$) and $c_j$ to obtain a distance between $c_i$ and $c_j$.

The calculating section of distance (423) may perform step 214 described in FIG. 2B.

The calculating section of expertness value (424) divides a sum of the obtained distances by the number of the pairs of the identified categories.

The calculating section of expertness value (424) may perform step 215 described in FIG. 2B.

The judging section (425) determines an expertness level for the target keyword, based on the degree of dispersion.

The judging section (425) may perform step 216 described in FIG. 2B.

The assigning section (426) outputs an expertness level (493) by assigning a higher expertness level to the target keyword or assigning an expertness level other than a higher expertness level, for example, but not limited to, a lower expertness level or middle expertness level.

The assigning section (426) may perform steps 217 and 218 described in FIG. 2B.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed:

1. A computer-implemented method for selecting electronic documents based on an expertness level for a target keyword, comprising:
    identifying a Lowest Common Ancestor (LCA) for each pair of categories to which documents in a document set belong based on a graph having edges which define relationships between nodes representing respective ones of the categories, the document set being associated with a target keyword;
    obtaining a degree of dispersion of the categories based on respective calculated distances between the categories of each pair and the corresponding LCA;
    determining an expertness level for the target keyword based on the degree of dispersion;
    receiving a search query including the target keyword; and
    in response to receiving the search query including the target keyword, selecting one or more documents from a database based on the expertness level for the target keyword.

2. The method according to claim 1, wherein, on condition that the degree of dispersion is lower, the expertness level for the target keyword is determined to be higher or a higher expertness level is assigned to the target keyword.

3. The method according to claim 1, wherein the degree of dispersion is obtained based on an average of the calculated distances.

4. The method according to claim 1, wherein the graph is a Directed Acyclic Graph.

5. The method according to claim 1, wherein the degree of dispersion is obtained by: obtaining a sum of the calculated distances; and
    dividing the obtained sum by a number of the pairs of the identified categories.

6. The method according to claim 1, wherein the expertness level is determined based on the degree of dispersion and a number of documents in the document set.

7. The method according to claim 6, wherein the expertness value is determined as a linear combination of at least the degree of dispersion and the number of documents in the document set.

8. The method according to claim 7, wherein the expertness level is determined as $\alpha \times$(the degree of dispersion)+$\beta \times$(the number of the documents in the document set), where $\alpha$ and $\beta$ are parameters representing weight values.

9. The method according to claim 8, wherein $\alpha$ and $\beta$ are adopted by preparing training data comprising keywords associated with respective expertness levels.

10. The method according to claim 7, wherein the expertness level is determined as $\alpha \times$(the degree of dispersion)+$\beta \times$(the number of the documents in the document set)+$\gamma \times$(depth in the graph)+$\delta \times$(tf-idf for the target keyword), where $\alpha, \beta, \gamma$ and $\delta$ are parameters representing weight values, and the tf-idf for the target keyword is a term frequency-inverse document frequency for the target keyword.

11. A system for selecting electronic documents based on an expertness level for a target keyword, comprising:
    a memory storing a program, which, when executed on the processor, performs a method for determining an expertness level for a target keyword, the method comprising:
        identifying a Lowest Common Ancestor (LCA) for each pair of categories to which documents in a document set belong based on a graph having edges which define relationships between nodes representing respective ones of the categories, the document set being associated with a target keyword;
        obtaining a degree of dispersion of the categories based on respective calculated distances between the categories of each pair and the corresponding LCA;
        determining an expertness level for the target keyword based on the degree of dispersion; and
        in response to receiving a search query including the target keyword, selecting one or more documents from a database based on the expertness level for the target keyword.

12. The system according to claim 11, wherein, on condition that the degree of dispersion is lower, the expertness level for the target keyword is determined to be higher or a higher expertness level is assigned to the target keyword.

13. The system according to claim 11, wherein the degree of dispersion is obtained based on an average of the calculated distances.

14. The system according to claim 11, wherein the degree of dispersion is obtained by: obtaining a sum of the calculated distances; and
    dividing the obtained sum by a number of the pairs of the identified categories.

15. The system according to claim 11, wherein the expertness level is determined based on the degree of dispersion and a number of documents in the document set.

16. The system according to claim 15, wherein the expertness value is determined as a linear combination of at least the degree of dispersion and the number of documents in the document set.

17. The system according to claim 16, wherein the expertness level is determined as α×(the degree of dispersion)+β×(the number of the documents in the document set), where α and β are parameters representing weight values.

18. The system according to claim 17, wherein α and β are adopted by preparing training data comprising keywords associated with respective expertness levels.

19. The system according to claim 16, wherein the expertness level is determined as α×(the degree of dispersion)+β×(the number of the documents in the document set)+γ×(depth in the graph)+δ×(tf-idf for the target keyword), where α, β, γ and δ are parameters representing weight values, and the tf-idf for the target keyword is a term frequency-inverse document frequency for the target keyword.

20. A computer program product for determining an expertness level for a target keyword, the computer program product comprising a non-transitory computer usable storage medium having program instructions embodied therewith, wherein the computer readable storage medium is not a transitory signal per se, the program instructions executable by a computer to cause the computer to perform a method, the method comprising:

identifying a Lowest Common Ancestor (LCA) for each pair of categories to which documents in a document set belong based on a graph having edges which define relationships between nodes representing respective ones of the categories, the document set being associated with a target keyword;

obtaining a degree of dispersion of the categories based on respective calculated distances between the categories of each pair and the corresponding LCA;

determining an expertness level for the target keyword based on the degree of dispersion;

receiving a search query including the target keyword; and in response to receiving the search query including the target keyword, selecting one or more documents from a database based on the expertness level for the target keyword.

* * * * *